United States Patent
Hakkani-Tur et al.

(10) Patent No.: US 7,263,486 B1
(45) Date of Patent: Aug. 28, 2007

(54) ACTIVE LEARNING FOR SPOKEN LANGUAGE UNDERSTANDING

(75) Inventors: Dilek Z. Hakkani-Tur, Morris Plains, NJ (US); Robert Elias Schapire, Princeton, NJ (US); Gokhan Tur, Morris Plains, NJ (US)

(73) Assignee: AT&T Corp., New York, NY (US)

( * ) Notice: Subject to any disclaimer, the term of this patent is extended or adjusted under 35 U.S.C. 154(b) by 862 days.

(21) Appl. No.: 10/404,699

(22) Filed: Apr. 1, 2003

Related U.S. Application Data

(60) Provisional application No. 60/421,343, filed on Oct. 25, 2002.

(51) Int. Cl.
*G10L 15/16* (2006.01)
(52) U.S. Cl. ...................... 704/243; 245/241
(58) Field of Classification Search ............... 704/243, 704/245, 241, 231
See application file for complete search history.

(56) References Cited

U.S. PATENT DOCUMENTS

| | | | | |
|---|---|---|---|---|
| 5,860,063 | A * | 1/1999 | Gorin et al. | 704/257 |
| 6,173,261 | B1 * | 1/2001 | Arai et al. | 704/257 |
| 2004/0205482 | A1 | 10/2004 | Basu et al. | 715/500.1 |

OTHER PUBLICATIONS

Thompson et al. "Active Learning for Natural Language Parsing and Information Extraction", Proc. Of 16th Intern. Machine Learning Conf., pp. 406-414, Jun. 1999.*

C. Allauzen and M. Mohri. Efficient Algorithms for Testing the Twins Property. *Journal of Automata, Languages and Combinatorics*, 2003.

M. Mohri. On Some Applications of Finite-State Automata Theory to Natural Language Processing. *Journal of Natural Language Engineering*, 2:1-20, 1996.

M. Mohri. Finite-State Transducers in Language and Speech Processing. Computational Linguistics, 23(2), 1997.

M. Mohri, F.C.N. Pereira, and M. Riley. Weighted Automata in Text and Speech Processing. In *Proceedings of the 12th biennial European Conference on Artificial Intelligence (ECAI-96), Workshop on Extended finite state models of language*, Budapest, Hungary. ECAI, 1996.

M. Mohri and M. Riley. Integrated Context-Dependent Networks in Very Large Vocabulary Speech Recognition. In *Proceedings of the 6th European Conference on Speech Communication and Technology (Eurospeech '99)*, Budapest, Hungary, 1999.

* cited by examiner

*Primary Examiner*—David Hudspeth
*Assistant Examiner*—Qi Han

(57) ABSTRACT

Disclosed is a system and method of training a spoken language understanding module. Such a module may be utilized in a spoken dialog system. The method of training a spoken language understanding module comprises training acoustic and language models using a small set of transcribed data $S_T$, recognizing utterances in a set $S_u$ that are candidates for transcription using the acoustic and language models, computing confidence scores of the utterances, selecting k utterances that have the smallest confidence scores from $S_u$ and transcribing them into a new set $S_i$, redefining $S_t$ as the union of $S_t$ and $S_i$, redefining $S_u$ as $S_u$ minus $S_i$, and returning to the step of training acoustic and language models if word accuracy has not converged.

16 Claims, 5 Drawing Sheets

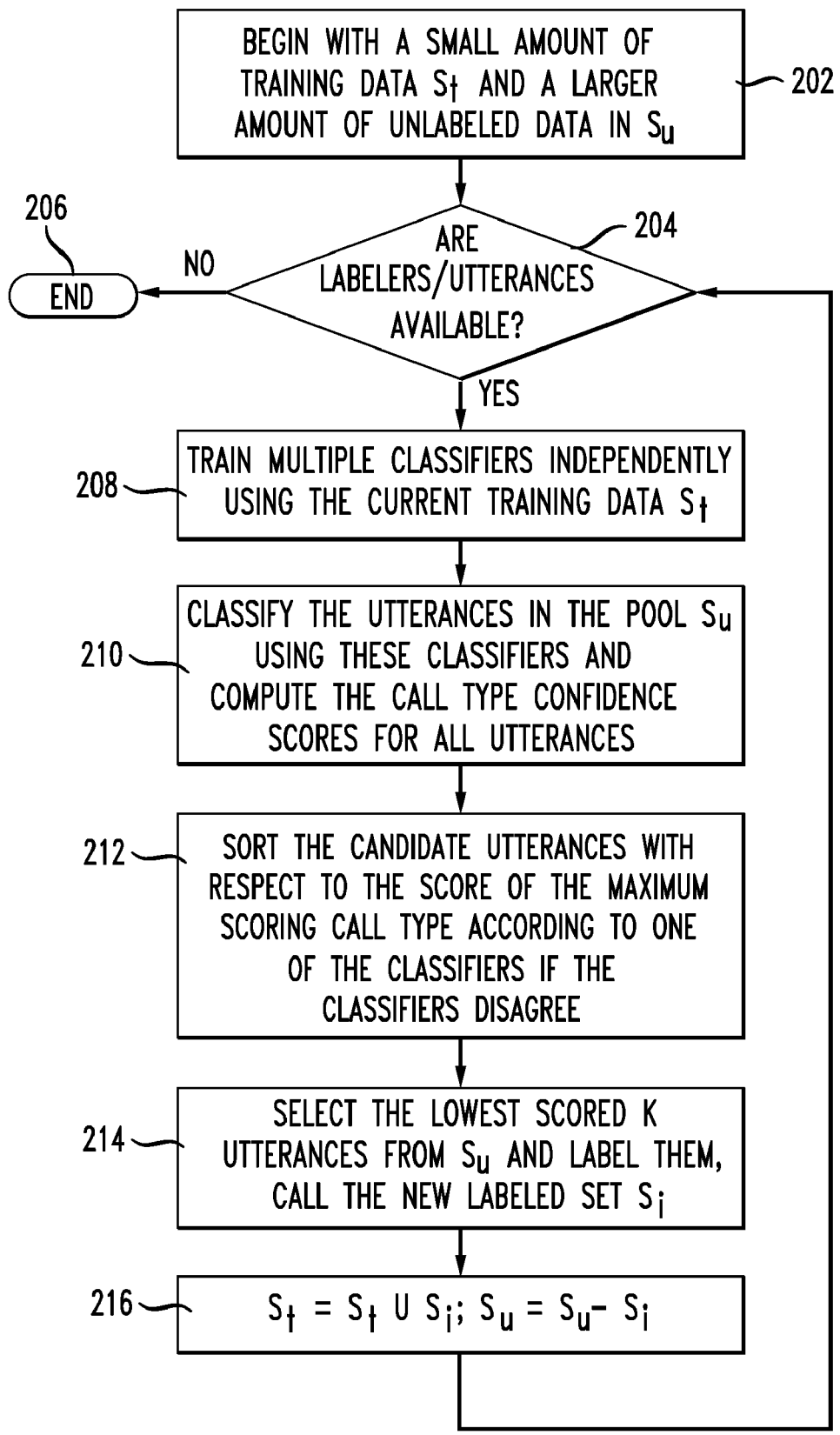

ACTIVE LEARNING FOR SPOKEN LANGUAGE UNDERSTANDING

PRIORITY CLAIM

The present application claims priority to Provisional Patent Application No. 60/421,343, filed Oct. 25, 2002, the contents of which are incorporated herein by reference.

RELATED APPLICATIONS

The present application is related to AT&T application Ser. No. 10/447,888 and application Ser. No. 10/329,139, the contents of which are incorporated herein by reference.

BACKGROUND OF THE INVENTION

1. Field of the Invention

The present invention relates to spoken dialog systems and more specifically to a system and method of active learning to bootstrap a spoken language understanding module.

2. Introduction

Spoken dialog systems enable customers to express what they want in spoken natural language. To carry on such a natural language dialog, the spoken dialog system generally consists of various modules to process the received speech sounds from the customer and generate a synthetic speech response. These modules comprise an automatic speech recognition module, a spoken language understanding module, a dialog management module, and a text-to-speech module.

The process of building a spoken dialog system is traditionally a very time-consuming and labor-intensive activity for training and generating each of these modules. The present invention relates to an improvement in the method of training the spoken language understanding module. A spoken language understanding module generated according to the method disclosed herein may or may not be used with a spoken dialog system containing all the other modules but may have other applications as well.

BRIEF DESCRIPTION OF THE DRAWINGS

In order to describe the manner in which the above recited and other advantages and features of the invention can be obtained, a more particular description of the invention briefly described above will be rendered by reference to specific embodiments thereof that are illustrated in the appended drawings. Understanding that these drawings depict only typical embodiments of the invention and are not therefore to be considered to be limiting of its scope, the invention will be described and explained with additional specificity and detail through the use of the accompanying drawings in which:

FIGS. 2A and 2B illustrate methods of active learning for a spoken language understanding module according to another embodiment of the invention;

DETAILED DESCRIPTION OF THE INVENTION

Figure 1:
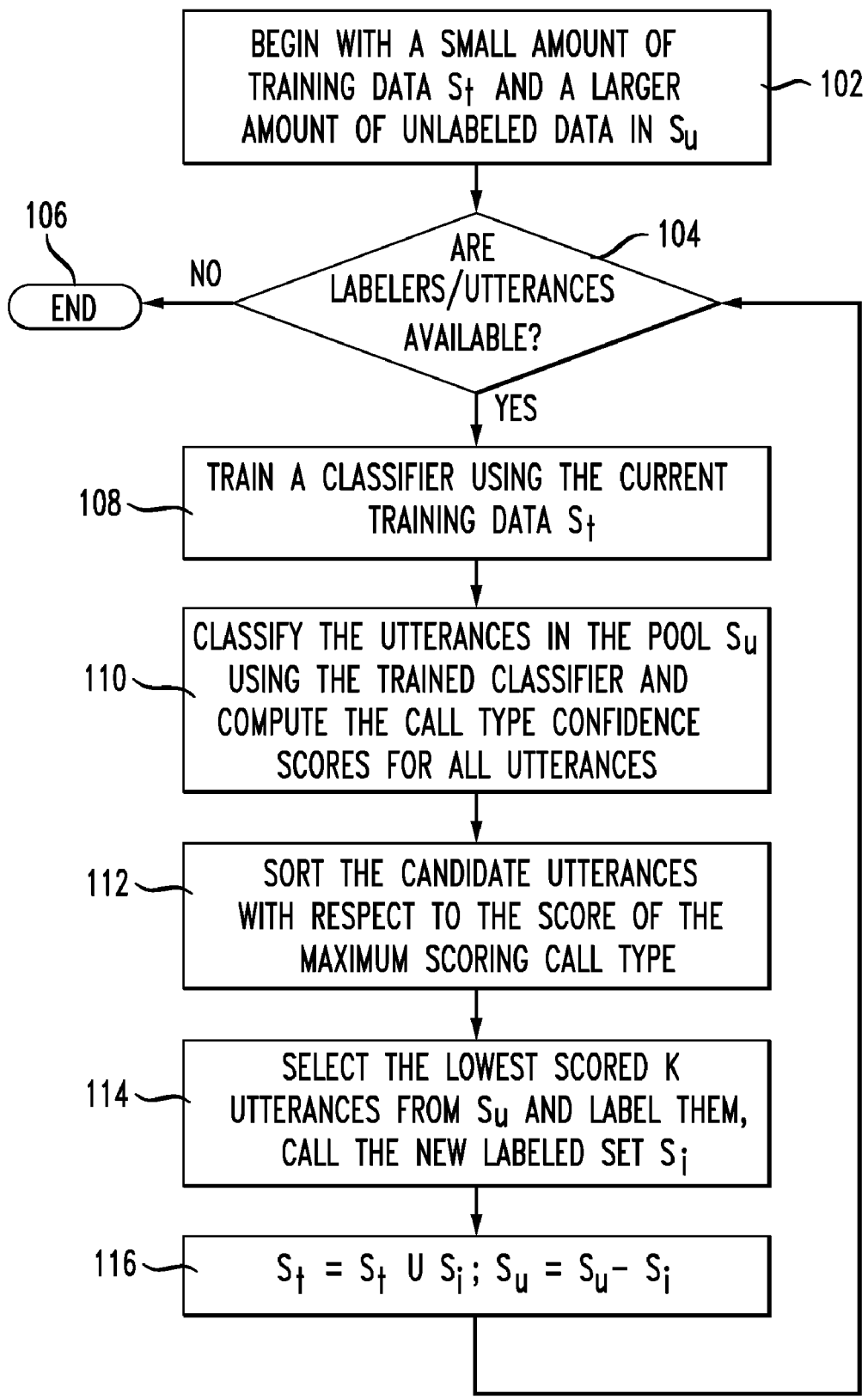
FIG. 1 illustrates a method of active learning for a spoken language understanding module according to an embodiment of the invention.

What is needed in the art is an improved method of training classifiers associated with the spoken language understanding module to decrease the human labeling effort. In general, spoken language understanding is the process of determining the intent of the user. One example implementation of a spoken language understanding module is a classifier that determines the intent or the calltype of a call. Disclosed herein are active learning methods for reducing the labeling effort in a statistical call classification system. Active learning aims to minimize the number of labeled utterances by automatically selecting for labeling the utterances that are likely to be most informative. The invention comprises two method embodiments as well as corresponding apparatus and computer-readable medium embodiments.

The method according to the first embodiment of the invention relates to certainty-based active learning and selects the examples that the classifier is least confident about. The method of the second embodiment is related to committee-based active learning and selects the examples that multiple classifiers do not agree on.

These active learning methods have been evaluated using a call classification system used for AT&T customer care. The results indicate that it is possible to reduce human labeling effort at least by a factor of two. Voice-based natural dialog systems enable customers to express what they want in spoken natural language. Such systems automatically extract the meaning from speech input and act upon what people actually say, in contrast to what one would like them to say, thus shifting the burden from users to the machine. In a natural spoken dialog system, identifying the customer's intent can be seen as a call classification problem.

When statistical classifiers are employed for call classification, they are trained using large amounts of task data that is transcribed and labeled by humans, a very expensive and laborious process. "Labeling" means assigning a predefined call type to each utterance. Building better call classification systems in a shorter time frame provides the motivation to employ active learning techniques. An aim of the present invention, although not a required result unless recited in a claim below, is to reduce the number of training examples to be labeled by inspecting the unlabeled examples and intelligently selecting the most informative ones with respect to a given cost function for a human to label. The active learning algorithm selects the examples that will have the largest improvement on the performance, hence reducing the amount of human labeling effort.

Selectively sampling the utterances assumes that there is a pool of candidate utterances to label. In a deployed natural dialog system, this is indeed the case, where a constant stream of raw data is collected from the field. Prior to deployment of such a system, however, the aim of active learning is to come up with a sorting algorithm for a pre-existing pool of candidate utterances, hopefully indicating their informativeness. The intuition is that there is a reverse correlation with the confidence of the classifier and the informativeness of that utterance. That is, the higher the classifier's confidence, the less informative an utterance. It can be expected that the classifier would be trained better if human labelers label the utterances that are different enough for the classifier.

The first embodiment of the invention is illustrated by way of an example method disclosed in FIG. 1. Related to certainty-based active learning methods, the method disclosed in FIG. 1 comprises selecting for labeling the examples that are predicted the classifier will be most unsure about and leaving out the ones that it has classified with high confidence.

The method of FIG. 1 preferably assumes that a small amount of training data in a set $S_t$ exists along with a larger amount of unlabeled data in a set $S_u$ (102). The main steps of the method also preferably are practiced while labelers and utterances are still available to process (104). In this regard, the method illustrates a step (104) of determining whether labelers and utterances are available; and if not, the process ends (106). If labelers and utterances are still available, then the process continues with steps (108) through (116).

The method comprises training a classifier using a small set of labeled data $S_t$ (108). The training data is the current amount of training data available. This approach is independent of the classifier used. Using this classifier, the method comprises classifying the utterances in the pool $S_u$ using the trained classifier and computing call type confidence scores for all the utterances (110). Using the classifier score, one can predict which candidates are classified with high/low confidence. The utterances are transcribed that are most likely to have classification errors.

Next, the method comprises sorting the candidate utterances with respect to the score of the maximum scoring call type (112) and selecting the lowest scored k utterances from $S_u$ and labeling these utterances and assign them a new labeled set $S_i$ (114). New sets are then defined as $S_t=S_t \cup S_i$, and $S_u=S_u-S_i$ (116). The method may then return to step (104) to determine again whether labelers and utterances are still available for processing.

The parameter k is mainly determined by the capacity of the manual labeling effort and the size of the pool. The other parameter is the sorting criterion. One can come up with a different sorting criterion for sorting the utterances, such as the difference between the top two calltype scores, or by using other or all the calltype scores.

Note that the distribution of the calltypes in the selectively sampled training data have skewed from their priors. That is, the distribution of call types has become different in training and test data. One solution is to adjust the priors by up-sampling the data.

According to the second embodiment of the invention, a method of training a classifier relates to committee-based active learning methods. According to the second embodiment, examples that multiple classifiers disagree on are selected and the method leaves out the ones on which there is agreement (even if their score is low).

FIG. 2A illustrates the second embodiment of the invention. It is assumed that the method begins with a small amount of training data $S_t$ that are used to train acoustic and language models and a larger amount of unlabeled data in the pool $S_u$ (202). While labelers and/or utterances are available (204), the method comprises training multiple classifiers (which as is known in the art is associated with training the acoustic and language models) independently using the current training data $S_t$ (208), classifying the utterances in the pool $S_u$ and computing the call type confidence scores for all utterances (210), sorting the candidate utterances and respect to the score of the maximum scoring call type according to one of the classifiers if the classifiers disagree (212), selecting the lowest scored k utterances from $S_t$ and labeling them to create a new labeled set $S_i$ (214). Next, the sets are redefined as $S_t=S_t \cup S_i$, and $S_u=S_u-S_i$ (216), wherein the labeled utterances are used to generate the spoken language understanding module. The method returns to step (204) when the training of the multiple classifications or training of the acoustic and language models do not result in word accuracy that has converged.

Figure 2B:
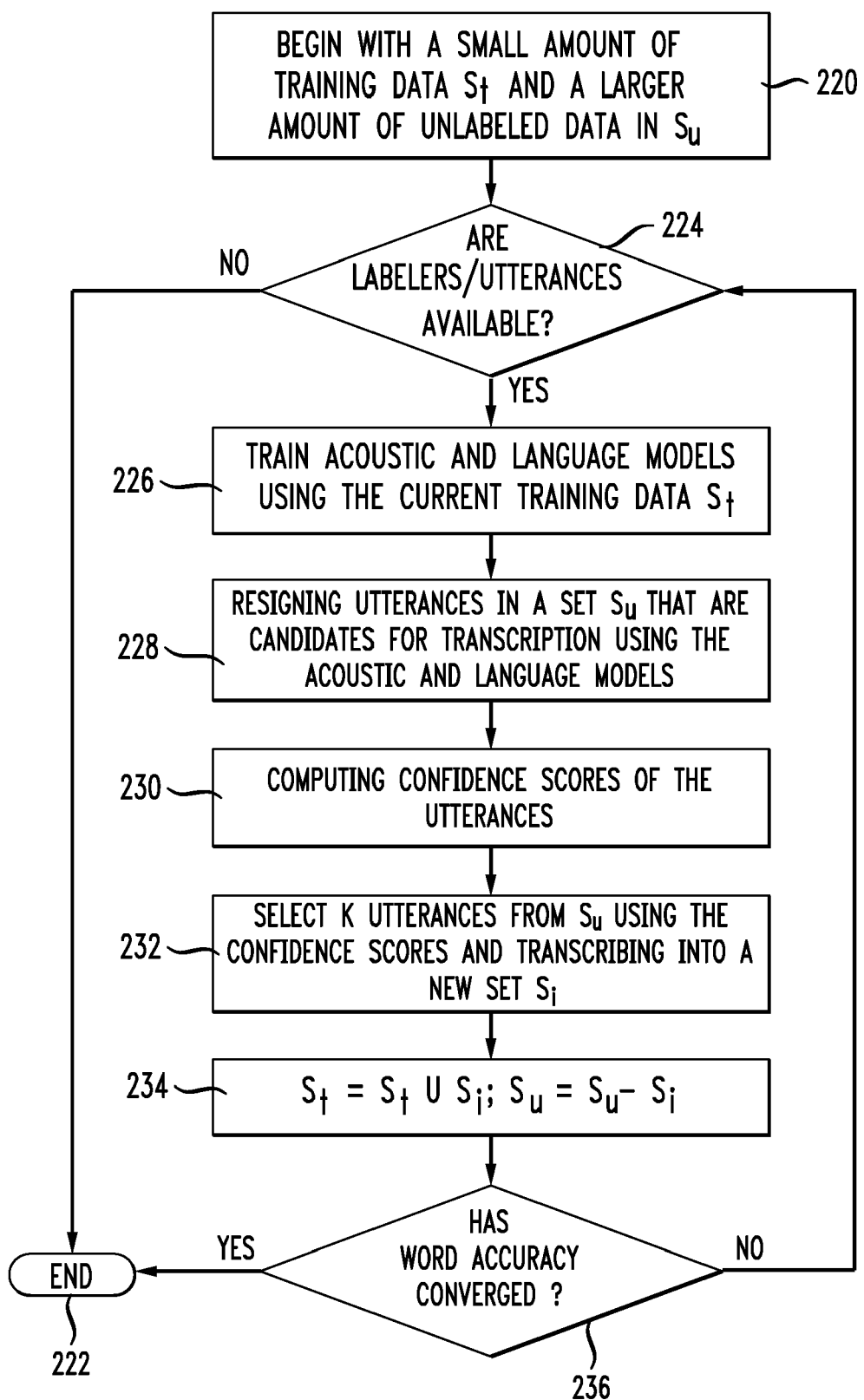

Note that getting a low score is not enough to get selected; it is also necessary that classifiers disagree. It is also possible to modify this criterion, such as sorting using the (weighted) multiplication of the scores of the top choices. FIG. 2B illustrates a method which may be practiced or used to generate a spoken language understanding module. As is shown in FIG. 2B, the method begins with a small amount of training data $S_t$ and a larger amount of unlabeled data in $S_u$ (220). The method determines whether labelers or utterances are available (224) and if so, the method comprises training acoustic and language models using the current training data set $S_t$ (226), recognizing utterances in a set $S_u$ that are candidates for transcription using the acoustic and language models (228), computing confidence scores of the utterance (230), selecting k utterances from $S_u$ using the confidence scores and transcribing them into a new set $S_i$ (232), redefining $S_t$ as the union of $S_t$ and $S_i$ and redefining $S_u$ as $S_u-S_i$ (234). The method also involves returning to step (224) if it is determined that word accuracy has not converged. If word accuracy has converged (236), the process ends at step (222).

A "cheating" experiment is also possible in this case by using the true labels as the output of a perfect classifier that does not make any mistakes. This approach is independent of the classifiers used, but it makes sense to use different kinds of classifiers that have comparable performance using different feature sets.

These active learning methods have been evaluated using the utterances from the database of the "How May I Help You?" system for AT&T customer care. In this dialog system, users are asking questions about their phone bills, calling plans, etc., and the system aims to classify them into 49 call types in total, such as Billing Credit or Calling Plans.

Two sets of experiments were performed. In the first set, 21,953 utterances were used from the responses to just the greeting and specification prompts, 17,553 utterances were used for training and 4,400 utterances for testing. The basic classifier used was the Llama support vector machine (SVM) classifier in this test. Those of skill in the art will sufficiently understand the use of the described classifier and thus no further description is provided herein.

Figure 3:
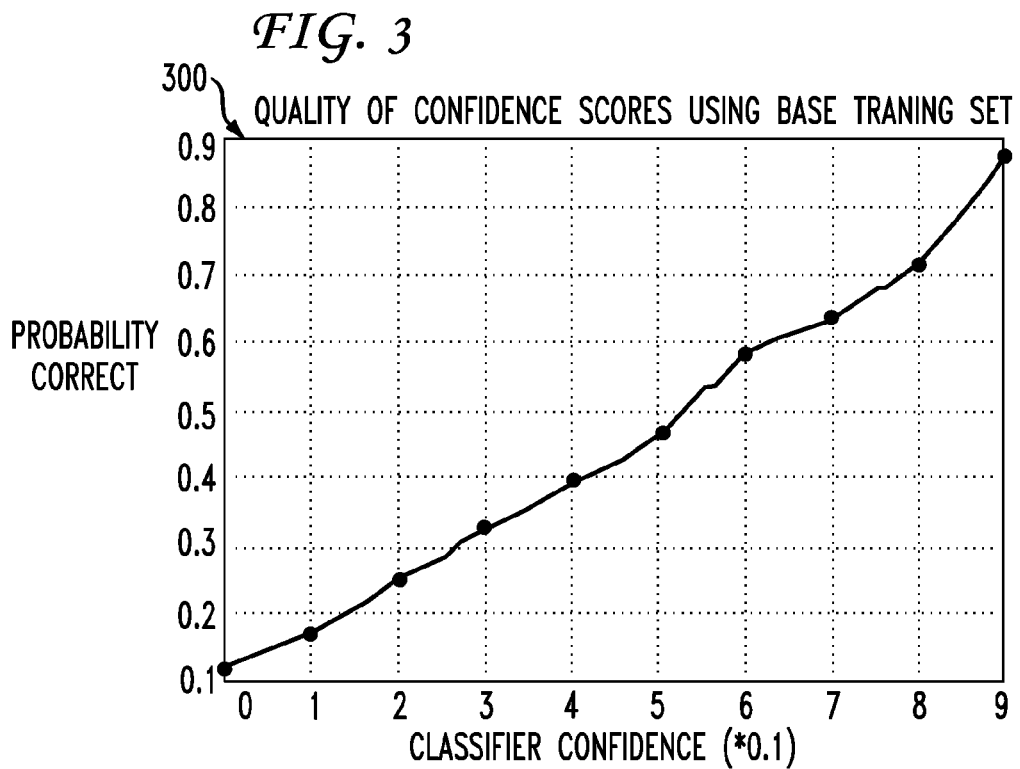
FIG. 3 is a graph illustrating the quality of classifier confidence scores using a base training set.

The experiment first involved checking the informativeness of using the classifier score with this data. An SVM classifier was trained using all the data. Word n-grams were used as features for classification. For each classifier score bin, the accuracy of its decision was computed. As seen in the graph 300 shown in FIG. 3, the result was an almost diagonal curve of accuracy with respect to the classifier score. These were the results expected.

Figure 4:
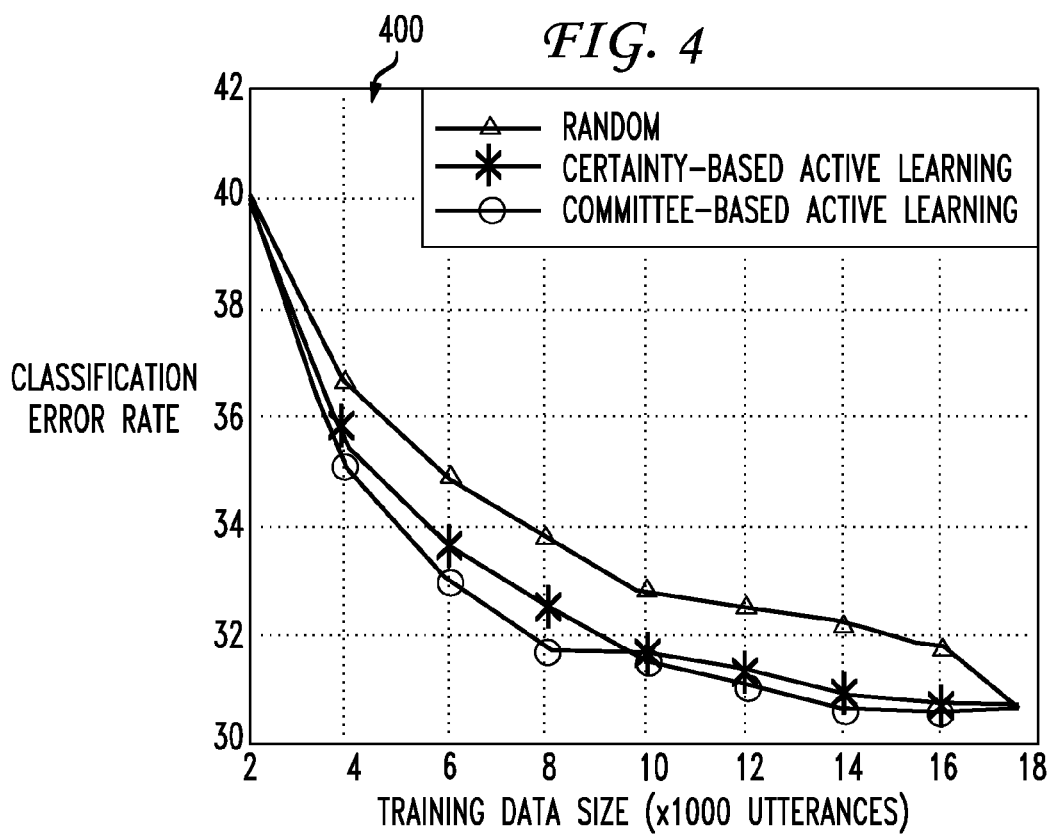
FIG. 4 is a graph illustrating the error rates using random and active learning methods for labeling.

One experiment using the first embodiment of the invention began with a test of using only an SVM classifier. In order to see the actual improvement, controlled experiments were performed comparing the first and second embodiment methods with random sampling. The inventors incrementally trained the classifier for every 2000 utterances (k=2000) and generated learning curves for classification error rate, one for random sampling and one for selective sampling which are presented in the graph 400 shown in FIG. 4. The classification error rate is the number of utterances where the maximum scoring call type is not one of the true call types for the particular data size and method for labeling. It is evident that selective sampling significantly reduces the need for labeled data. For instance, achieving an error rate of 32% requires roughly 15,000 random examples but only about 9,000 selectively sampled examples, a 40% savings in labeling effort. The accuracy of the classifier improves much faster than using random sampling. Note that the final 2,553 utterances decrease the error rate by around 2% if random sampling is used. In the case of selective sampling, they have basically no effect on classification performance, another indicator that the certainty-based method works well in determining the informativeness of an utterance.

The inventors used the same data to test the effect of the second embodiment of the invention. In addition to the SVM classifier, another classifier was trained using BoosTexter, an implementation of the AdaBoost algorithm, again using word n-grams as features. Learning curves were generated, one for random sampling and the other for selective sampling as seen in the graph 500 of FIG. 5. This method outperformed the previous method, and the inventors thus managed to achieve the same performance obtained using 16,000 random utterances with only 8,000 selectively sampled utterances, a factor of two reduction in labeling effort.

Note that, because these are controlled experiments, the performance using all available training data is the same both for random sampling and selective sampling. Therefore, eventually the selective sampling curve must reflect the "uninformative" data at the end of the list. For this reason, in the actual implementation, one may expect the performance improvement using selective sampling to be larger.

In these experiments, the inventors have left aside the responses for confirmation prompts, such as "yes" or "no", and some machine-initiated sub-dialog prompts, such as "What is your phone number?" In order to see the performance with all of the data, a similar experiment was conducted following the certainty-based approach using BoosTexter alone. In this experiment, a larger dataset of 51,755 utterances was used, including the easy-to-classify examples omitted in the other experiments. The inventors used 40,000 randomly selected examples for training (i.e., as potential candidates for labeling) and the remainder for testing. The procedure was the same as for SVM's except that the confidence of the classifier in its prediction on a given example was defined to be the difference between the scores of the top two classes. Thus, on each iteration of the active-learning loop, the examples for which this difference was smallest were added to the training pool of labeled utterances.

Figure 5:
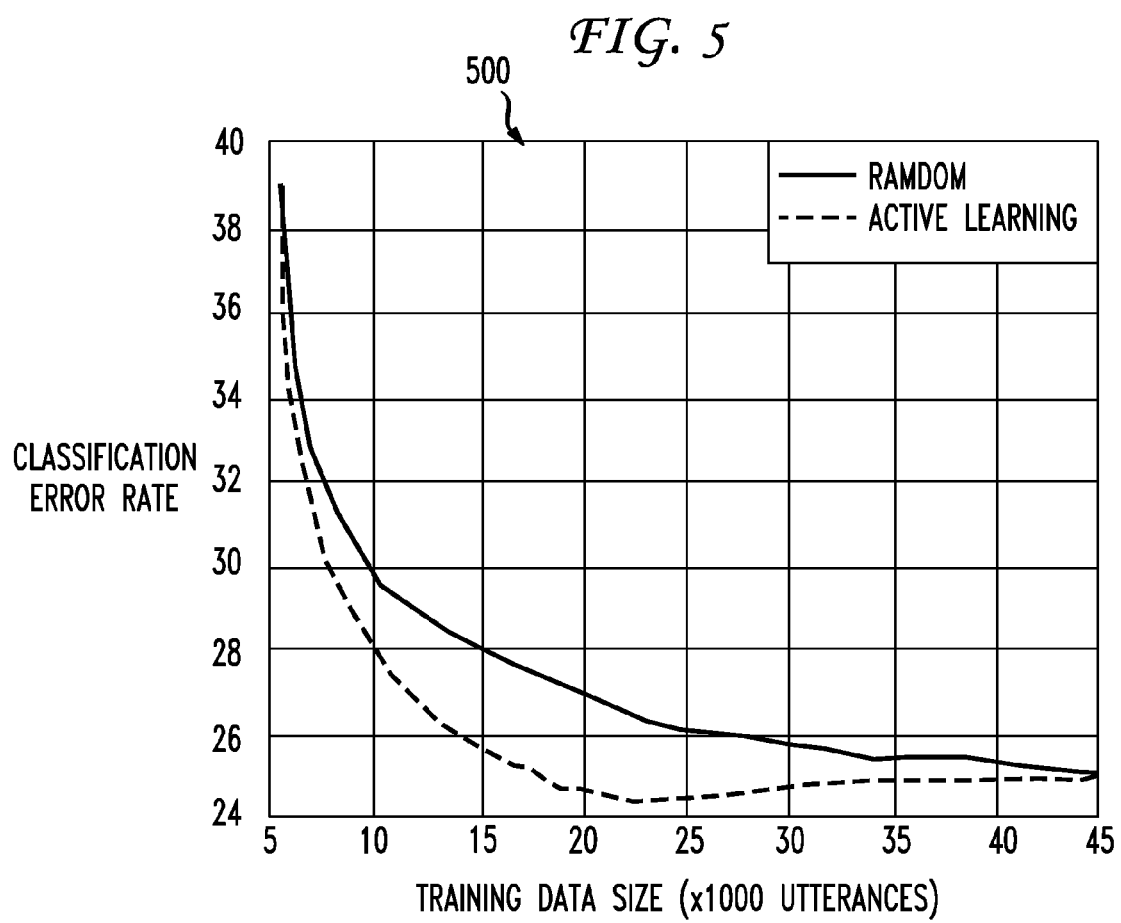
FIG. 5 illustrates the error rates achieved by Boostexter using active and random selection of examples for labeling.

FIG. 5 shows the results. In this experiment, 500 examples (k–500) were added on each iteration. Also, the entire experiment was repeated ten times and the results averaged. As before, substantial improvements are realized using active learning. For instance, achieving a test error of 25% requires 40,000 examples if randomly chosen, but only 13,000 actively selected examples, a savings of 68%.

The active learning curve shown in graph 500 of FIG. 5 also exhibits an interesting phenomenon for SVM's, wherein better performance can actually be achieved using fewer training examples. Apparently, examples added toward the end are not only uninformative, but actually disinformative.

The inventors have presented active learning algorithms for reducing the number of labeled training examples by selectively sampling a subset of the unlabeled data. Experiments show that, for the task of call classification, use of selective sampling makes it possible to speed up the learning rate of the classifier with respect to the amount of labeled utterances. The results indicate that it is possible to achieve the same call classification accuracy using less than half the labeled data. Two approaches are disclosed, one related to certainty-based active learning and the other related to committee-based active learning methods. The second embodiment of the invention related to committee-based active learning methods is preferable in that its results are superior, although through testing the inventors used two large margin classifiers, SVM's and AdaBoost, with the same features sets (n-grams).

Embodiments within the scope of the present invention may also include computer-readable media for carrying or having computer-executable instructions or data structures stored thereon. Such computer-readable media can be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium which can be used to carry or store desired program code means in the form of computer-executable instructions or data structures. When information is transferred or provided over a network or another communications connection (either hardwired, wireless, or a combination thereof) to a computer, the computer properly views the connection as a computer-readable medium. Thus, any such connection is properly termed a computer-readable medium. Combinations of the above should also be included within the scope of the computer-readable media.

Computer-executable instructions include, for example, instructions and data which cause a general purpose computer, special purpose computer, or special purpose processing device to perform a certain function or group of functions. Computer-executable instructions also include program modules that are executed by computers in stand-alone or network environments. Generally, program modules include routines, programs, objects, components, and data structures, etc. that perform particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

Those of skill in the art will appreciate that other embodiments of the invention may be practiced in network computing environments with many types of computer system configurations, including personal computers, hand-held devices, multi-processor systems, microprocessor-based or programmable consumer electronics, network PCs, mini-computers, mainframe computers, and the like. Embodiments may also be practiced in distributed computing environments where tasks are performed by local and remote processing devices that are linked (either by hardwired links, wireless links, or by a combination thereof through a communications network. In a distributed computing environment, program modules may be located in both local and remote memory storage devices.

Although the above description may contain specific details, they should not be construed as limiting the claims in any way. Other configurations of the described embodiments of the invention are part of the scope of this invention. Accordingly, the appended claims and their legal equivalents should only define the invention, rather than any specific examples given.

We claim:

1. A method generating a classifier from training data $S_t$ and a larger amount of unlabeled data in a pool $S_u$, the method comprising:

(1) training a classifier using current training data $S_t$, the training data $S_t$ generated by sampling a plurality of utterances;
(2) classifying utterances in a pool $S_u$ using the trained classifier;
(3) computing a call type confidence score for each utterance;
(4) sorting candidate utterances with respect to the confidence score of the maximum scoring call type;
(5) selecting the lowest scored k utterances from $S_u$ using the confidence scores and labeling them to define a labeled set $S_i$;
(6) redefining $S_t = S_t \cup S_i$; and
(7) redefining $S_u = S_u - S_i$.

2. The method of claim 1, wherein steps 1 through 7 are practiced until labelers and utterances are no longer available.

3. The method of claim 1, wherein k is more than one.

4. The method of claim 1, wherein selecting k utterances from $S_u$ further comprises leaving out utterances with confidence scores indicating that the utterances were correctly recognized.

5. The method of claim 1, wherein selecting k utterances from $S_u$ further comprises selecting the lowest scoring k utterances from $S_u$.

6. The method of claim 1, wherein selecting k utterances from $S_u$ further comprises selecting utterances according to a confidence score distribution that is closest to a prior distribution.

7. A system having spoken language understanding module generated according to a method comprising:
(1) training a plurality of classifiers independently using a training data set $S_t$, the training data $S_t$ generated by sampling a plurality of utterances;
(2) classifying utterances in a set $S_u$ using the plurality of classifiers and computing a call type confidence score for all utterances;
(3) sorting candidate utterances with respect to a score of the maximum scoring call type according to one of the classifiers if the classifiers disagree;
(4) selecting and labeling the lowest scored k utterances from $S_u$ to define a labeled set $S_i$ and redefining $S_t$ and $S_u$ as follows:
(5) $S_t = S_t \cup S_i$; and
(6) $S_u = S_u - S_t$, wherein the labeled utterances are used to generate the spoken language understanding module.

8. The system of claim 7, wherein selecting k utterances from $S_u$ further comprises selecting the lowest scoring k utterances from $S_u$.

9. The system of claim 7, wherein the method further comprises performing steps 1-6 while labelers and utterances are available.

10. A system having spoken language understanding module trained using a method comprising:

(1) training acoustic and language models using a small set of transcribed data $S_t$, the training data $S_t$ generated by sampling a plurality of utterances;
(2) recognizing utterances in a set $S_u$ that are candidates for transcription using the acoustic and language models;
(3) computing confidence scores of the utterances;
(4) selecting the lowest scored k utterances from $S_u$ using the confidence scores and transcribing them into a new set $S_i$;
(5) redefining $S_t$ as the union of $S_t$ and $S_i$;
(6) redefining $S_u$ as $S_u$ minus $S_i$; and
(7) returning to step (1) of word accuracy has not converged.

11. The system of claim 10, wherein selecting k utterances from $S_u$ further comprises selecting utterances according to a confidence score distribution that is closest to a prior distribution.

12. The system of claim 10, wherein selecting k utterances from $S_u$ further comprises selecting the lowest scoring k utterances from $S_u$.

13. A method of generating a spoken language understanding module, the method comprising, from small amount of training data $S_t$ and a larger amount of unlabeled data $S_u$:
(1) training a plurality a classifiers independently using a training data set $S_i$, the training data $S_t$ generated by sampling a plurality of utterances;
(2) classifying utterances in a set $S_u$ using the plurality of classifiers and computing a call type confidence score for all utterances;
(3) sorting candidate utterances with respect to a score of the maximum scoring call type according to one of the classifiers if the classifiers disagree;
(4) selecting and labeling the lowest scored k utterances from $S_u$ to define a labeled set $S_i$ and redefining $S_t$ and $S_u$ as follows:
(5) $S_t = S_t \cup S_i$; and
(6) $S_u = S_u - S_i$, wherein the labeled utterances are used to generate the spoken language understanding module.

14. The method of claim 13, wherein the steps occur only while labelers and utterances are available.

15. The method of claim 13, wherein selecting k utterances from $S_u$ further comprises selecting utterances according to a confidence score distribution that is closet to a prior distribution.

16. The method of claim 13, wherein selecting k utterances from $S_u$ further comprises selecting the lowest scoring k utterances from $S_u$.

* * * * *